United States Patent
Mathai et al.

(10) Patent No.: US 10,816,738 B2
(45) Date of Patent: Oct. 27, 2020

(54) TURNING MIRROR OPTICAL COUPLERS

(71) Applicant: HEWLETT PACKARD ENTERPRISE DEVELOPMENT LP, Houston, TX (US)

(72) Inventors: Sagi Mathai, Sunnyvale, CA (US); Michael Renne Ty Tan, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 100 days.

(21) Appl. No.: 15/521,539

(22) PCT Filed: Oct. 24, 2014

(86) PCT No.: PCT/US2014/062236
§ 371 (c)(1),
(2) Date: Apr. 24, 2017

(87) PCT Pub. No.: WO2016/064425
PCT Pub. Date: Apr. 28, 2016

(65) Prior Publication Data
US 2017/0307834 A1    Oct. 26, 2017

(51) Int. Cl.
*G02B 6/42*    (2006.01)
*G02B 6/24*    (2006.01)

(52) U.S. Cl.
CPC .............. *G02B 6/4214* (2013.01); *G02B 6/24* (2013.01)

(58) Field of Classification Search
CPC .................................. G02B 6/4214; G02B 6/24
See application file for complete search history.

(56) References Cited

U.S. PATENT DOCUMENTS

| | | |
|---|---|---|
| 7,650,052 B2 | 1/2010 | Krishnamoorthy et al. |
| 8,548,291 B2 | 10/2013 | Doerr et al. |
| 8,772,704 B2 | 7/2014 | Mack et al. |
| 9,746,608 B1 * | 8/2017 | Rabiei .................... G02B 6/124 |

(Continued)

OTHER PUBLICATIONS

Chiu, et al., Multimode Waveguide Turning-mirror Couplers [online], Nov. 2-6, 2009, Communication and Photonics Conference and Exhibition Asia (ACP), Retrieved from the Internet <http://ieeexplore.ieee.org/stamp/stamp.jsp?arnumber=5377313.

(Continued)

*Primary Examiner* — Tony Ko
(74) *Attorney, Agent, or Firm* — Sheppard Mullin Richter & Hampton LLP

(57) ABSTRACT

One example includes an optical coupler. The optical coupler includes a waveguide formed in a first layer of a layered structure that is to propagate an optical signal. The waveguide includes an end portion. The optical coupler also includes a turning mirror that includes a bulk structure and a reflective material deposited on an angular face of the bulk structure to form a surface of the turning mirror. The bulk structure can have a greater cross-sectional size than a cross-sectional size of the waveguide, such that the angular face extends above the first layer of the layered structure and extends into a second layer of the layered structure below the first layer. The surface of the turning mirror can be arranged to reflect the optical signal that is provided from the end portion of the waveguide.

9 Claims, 2 Drawing Sheets

(56) References Cited

U.S. PATENT DOCUMENTS

| | | | |
|---|---|---|---|
| 2002/0080457 A1* | 6/2002 | Nakanishi | G02B 6/12007 |
| | | | 398/202 |
| 2006/0022289 A1* | 2/2006 | Badhei | G02B 6/10 |
| | | | 257/432 |
| 2006/0239605 A1 | 10/2006 | Palen et al. | |
| 2009/0316275 A1 | 12/2009 | Baugh | |
| 2011/0129181 A1* | 6/2011 | Bolle | G02B 6/4214 |
| | | | 385/14 |
| 2011/0136063 A1 | 6/2011 | Nottola et al. | |
| 2013/0051729 A1 | 2/2013 | Chen et al. | |
| 2017/0123173 A1* | 5/2017 | Ji | G02B 6/4251 |

OTHER PUBLICATIONS

PCT/ISA/KR, International Search Report, dated Jul. 24, 2017, PCT/US2014/062236, 13 pages.

\* cited by examiner

TURNING MIRROR OPTICAL COUPLERS

BACKGROUND

Optical communications have become more prevalent as the demand for high-speed communication and processing has increased. Optical communications typically implement a laser and/or other optical devices for providing and receiving optical signals that are carried on optical fibers or other optical waveguides. Optical systems can typically implement optical couplers to couple light into or out of single-mode or multimode optical fibers or waveguides. Optical couplers can include turning mirrors to change an optical path of an optical signal, such as to couple the optical signal into the respective optical fiber or waveguide. As an example, optical couplers can be configured as grating couplers or as edge-coupled tapered waveguides.

DETAILED DESCRIPTION

Figure 1:
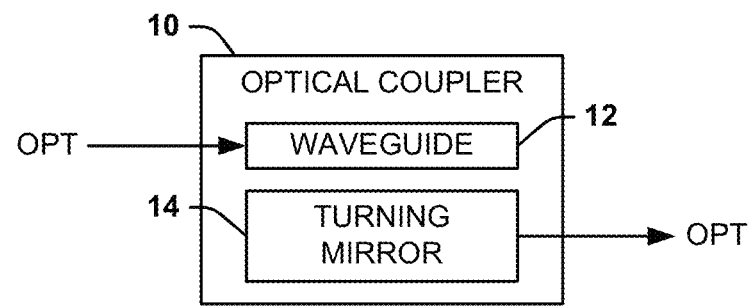
FIG. 1 illustrates an example diagram of an optical coupler.

FIG. 1 illustrates an example diagram of an optical coupler 10. The optical coupler 10 can be implemented in any of a variety of optical communications systems to couple an optical signal OPT into a propagation medium, such as an optical fiber or a waveguide. As an example, the optical signal OPT can correspond to a signal generated by a laser and can be modulated to carry data.

The optical coupler 10 includes a waveguide 12 and a turning mirror 14. The waveguide 12 can be configured as a layered structure (e.g., a semiconductor structure), such that the waveguide 12 can be fabricated from a first layer in the optical coupler configured as a layered structure. For example, the optical coupler 10 can be fabricated from a silicon-on-insulator (SOI) structure that includes a first silicon layer, a second silicon layer, and an insulator layer (e.g., a buried-oxide layer) that interconnects the first and second silicon layers. While the layered structure is described herein as being an SOI layered structure, it is to be understood that any of a variety of layered structures can be implemented for the optical coupler 10. The optical signal OPT can propagate in the waveguide 12 and can exit the waveguide 12 via an end portion to be reflected by the turning mirror 14, such that the reflected optical signal OPT can be provided from the optical coupler 10, such as to be launched into free space, an optoelectronic device, an optical connector, optical fiber, another waveguide, or another optical element.

The turning mirror 14 can be configured in a variety of different ways, as described herein. As an example, the turning mirror 14 can be configured as a deposited reflective material on a bulk structure formed on the layered structure of the optical coupler 10. For example, the bulk structure on which the turning mirror 14 is formed can extend above and below a cross-section of the waveguide 12, such as to allow complete reflection of the diverging optical signal OPT. Therefore, the turning mirror 14 can be provided a sufficient distance from the end portion of the waveguide 12 for optical coupling absent a beam-collimator. As another example, the turning mirror 14 can be configured as a total-internal-reflection (TIR) mirror. For example, the turning mirror 14 can be configured as a boundary between a medium, such as a dielectric material or as air, and an interposing material that interconnects the end portion of the waveguide 12 and the medium. Therefore, the turning mirror 14 configured as a TIR mirror can reflect the optical signal OPT (e.g., from a top of the optical coupler 10 or through a substrate on the bottom of the optical coupler 10) to launch the optical signal OPT.

Figure 2:
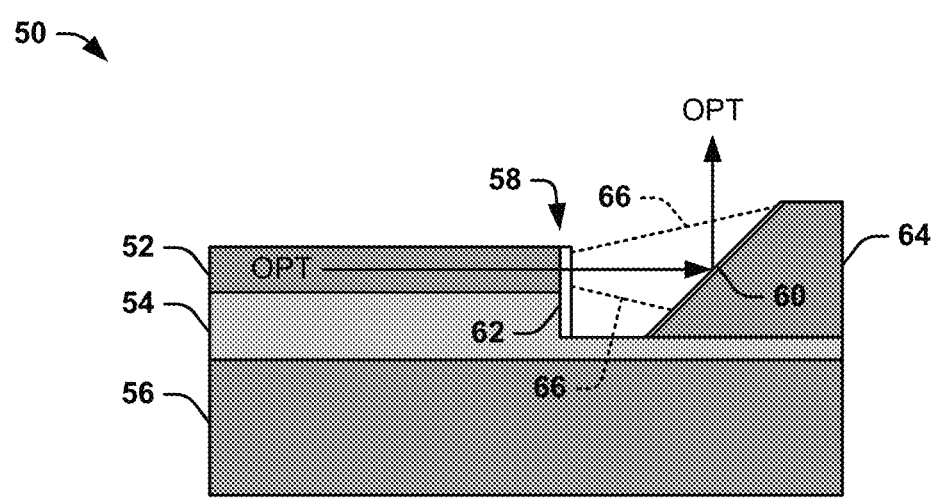
FIG. 2 illustrates an example of an optical coupler.

FIG. 2 illustrates an example of an optical coupler 50. The optical coupler 50 can be implemented in any of a variety of optical communications systems to couple an optical signal OPT into a propagation medium, such as an optical fiber or a waveguide. The optical coupler 50 is demonstrated in the example of FIG. 2 as one example of the optical coupler 10 in the example of FIG. 1. The optical coupler 50 is demonstrated in the example of FIG. 2 in a longitudinal cross-sectional view.

The optical coupler 50 comprises a first semiconductor layer 52 that is configured as a waveguide (hereinafter waveguide 52), includes an insulator layer 54 (e.g., a buried-oxide layer), and a second semiconductor layer 56 (e.g., substrate). As an example, the optical coupler 50 can be fabricated from an SOI structure, such that the first semiconductor layer 52 and the second semiconductor layer 56 can be configured as respective silicon layers. The optical signal OPT propagates in the waveguide 52 to an end portion 58, and exits the end portion 58 to propagate in a medium (e.g., air) before being reflected by a turning mirror 60. In the example of FIG. 2, the turning mirror 60 is demonstrated as having an angular face that is arranged at approximately 45 degrees to reflect the optical signal OPT in an orthogonal direction relative to the propagation of the optical signal OPT in the waveguide 52. However, it is to be understood that the angular face of the turning mirror 60 can have a different angle to control the angle of reflection of the optical signal OPT. In an alternate example, layer 52 may be a dielectric material such as but not limited to silica, silicon nitride, silicon oxynitride. Substrate layer 56 may be configured as a glass layer.

In the example of FIG. 2, the optical coupler 50 includes an anti-reflective structure 62 arranged at the end portion 58. The anti-reflective structure 62 is configured to provide a refractive-index interface for the optical signal OPT between the waveguide 52 and the medium interposed between the end portion 58 of the waveguide 52 and the turning mirror 60. As a first example, the anti-reflective structure 62 can be configured as an anti-reflective coating that has been deposited on the end portion 58, such as including one or more layers of silicon-nitride and silicon-dioxide. As another example, the anti-reflective structure 62 can be configured as a sub-wavelength pattern including one or more sub-wavelength structures that are etched into sequential cross-sectional portions of the waveguide 52. As yet another example, the anti-reflective structure 62 can be configured as an adiabatic taper of the cross-section of the waveguide 52, such that the cross-sectional dimension of the waveguide 52 (e.g., with respect to lateral, vertical, or both cross-sectional dimensions) decreases in a gradient toward the end portion 58. Therefore, in any of these examples, the optical signal OPT can exit the end portion 58 of the waveguide 52 with substantially minimal reflective losses of portions of the optical signal OPT being reflected back into the waveguide 52.

The turning mirror 60 is demonstrated in the example of FIG. 2 as a reflective material that has been deposited on a bulk structure 64 that has been formed on the optical coupler 50. In the example of FIG. 2, the bulk structure 64 can correspond to any of a variety of materials (e.g., poly-silicon, silicon dioxide, silicon nitride, SU-8, polymer, or a variety of other materials), that has been deposited onto a portion of the insulator layer 54 and shaped (e.g., via lithography and dry or wet etching, or laser-ablation) to form the angular face. The reflective material can thus be deposited onto the angular face of the bulk structure 64 to form the turning mirror 60. As an example, the reflective material can correspond to a combination of reflective metal layers, such as titanium (Ti)/platinum (Pt)/gold (Au), that has been sputtered/etched onto the angular face of the bulk structure 64 to provide reflection of the optical signal OPT regardless of the wavelength, polarization, and waveguide modes of the optical signal OPT. As another example, the turning mirror 60 can be configured as any of a variety of other types of materials or mirrors, such as a distributed-Bragg reflector (DBR) having alternating layers of silicon dioxide and silicon nitride, a metal liftoff, or a metal/dielectric hybrid mirror. Therefore, the turning mirror 60 can be configured in a variety of ways.

In the example of FIG. 2, the bulk structure 64 has a height that extends both above the waveguide 52 and below the waveguide 52 into the insulator layer 54. The entire angular face of the bulk structure 64 can be configured as the turning mirror 60. Therefore, the turning mirror 60 can be configured to allow substantially complete reflection of the optical signal OPT, including diverging optical energy that is demonstrated in the example of FIG. 2 by the dashed lines 66. Therefore, the turning mirror 60 can be spaced apart from the end portion 58 of the waveguide 52 by a sufficient distance that can be greater than turning mirrors in other optical coupler systems that implement the turning mirror only in the same layer as the associated waveguide. Alternatively, the bulk structure 64 and/or the angular face of the bulk structure 64 in the example of FIG. 2 can be replaced by material composed of the first semiconductor layer 52, the insulator layer 54, and/or the second semiconductor layer 56, or any of a variety of materials deposited on the first semiconductor layer 52, the insulator layer 54, and/or the second semiconductor layer 56. In addition, the surface of the angular face of the bulk structure 64, and thus the turning mirror 60, can be fabricated as non-planar. Therefore, the turning mirror 60 can be further configured to at least one of split, focus, and collimate (e.g., symmetrically or asymmetrically) the reflected optical signal OPT, such as to provide mode matching and/or power splitting of the optical signal OPT to an associated optical fiber or waveguide into which the optical signal OPT is launched.

The optical coupler 50 can be fabricated in a variety of different ways. As an example, an SOI structure can be dry-etched with respect to the first semiconductor layer 52 and at least a portion of the insulator layer 54 to form a recess that defines the end portion 58 and the space on which the bulk structure 64 is formed. Subsequent to the dry-etch step, a layer of silicon dioxide can be deposited onto the SOI structure, and can undergo a lithography step (e.g., gray-scale lithography) and subsequent etching step to form the bulk structure 64 on the recess. The anti-reflective structure (e.g., anti-reflective coating) and reflective material can thus be deposited and sputtered, respectively, onto the end portion 58 and the bulk structure 64, respectively, to form the optical coupler 50.

Figure 3:
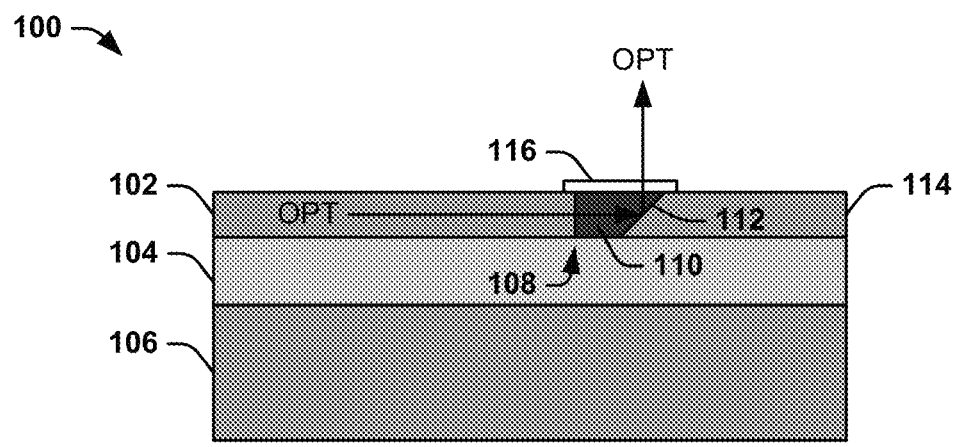
FIG. 3 illustrates another example of an optical coupler.

FIG. 3 illustrates another example of an optical coupler 100. The optical coupler 100 can be implemented in any of a variety of optical communications systems to couple an optical signal OPT into a propagation medium, such as an optical fiber or a waveguide. The optical coupler 100 is demonstrated in the example of FIG. 3 as one example of the optical coupler 10 in the example of FIG. 1. The optical coupler 100 is demonstrated in the example of FIG. 3 in a longitudinal cross-sectional view.

The optical coupler 100 comprises a first semiconductor layer 102 that is configured as a waveguide (hereinafter waveguide 102), includes an insulator layer 104 (e.g., a buried-oxide layer), and a second semiconductor layer 106 (e.g., substrate). As an example, the optical coupler 100 can be fabricated from an SOI structure, such that the first semiconductor layer 102 and the second semiconductor layer 106 can be configured as respective silicon layers. The optical signal OPT propagates in the waveguide 102 to an end portion 108, and exits the end portion 108 to propagate in an interposing material 110 before being reflected by a total-internal reflection (TIR) turning mirror 112. In the example of FIG. 3, the TIR turning mirror 112 is demonstrated as a boundary between the interposing material 110 and a dielectric material 114 that is deposited onto the insulator layer 104. The dielectric material 114 can be provided as an oxide or nitride deposition layer, and is demonstrated as having an angular face that is arranged at approximately 45 degrees to reflect the optical signal OPT in an orthogonal direction relative to the propagation of the optical signal OPT in the waveguide 102. However, it is to be understood that the angular face of the TIR turning mirror 112 can have a different angle to control the angle of reflection of the optical signal OPT. In addition, the dielectric material 114 can be air or silicon converted partially or entirely to silicon-dioxide by thermal oxidation.

As an example, the interposing material 110 can correspond to a variety of materials, such as a poly-silicon or amorphous silicon, that can be refractive index-matched (i.e. substantial refractive index-matched) to the waveguide modes propagating in waveguide 102 to substantially eliminate reflection at the interface between the interposing material 110 and the waveguide 102. As described herein, the terms 'refractive index-matched' and 'approximately equal refractive index' refer to refractive index matches with respect to optical modes propagating in the waveguide to substantially eliminate reflection at the interface between the two respective refractive index-matched materials Therefore, the interposing material 110 can be refractive-index-matched with the waveguide 102, such that the optical signal OPT can exit the end portion 108 of the waveguide 102 with substantially minimal reflective losses of portions of the optical signal OPT being reflected back into the waveguide 102. In cases where the refractive index cannot be substantially matched to the interposing material 110, anti-reflective coatings or anti-reflective subwavelength patterns can be formed on the end portion 108. However, the dielectric material 114 can have a refractive index that differs from the interposing material 110, such that the boundary of the interposing material 110 and the dielectric material 114 can act as the TIR mirror 112 to reflect the optical signal OPT. As another example, the angular face of the dielectric material 114 can be coated with another dielectric material, such as silicon dioxide, to provide the sufficient refractive index to form the TIR turning mirror 112 to reflect the optical signal OPT. In addition, the surface of the angular face of the dielectric material 114, and thus the TIR turning mirror 112, can be fabricated as non-planar. Therefore, the TIR turning mirror 112 can be further configured to at least one of focus and collimate (e.g., symmetrically or asymmetrically) the reflected optical signal OPT, such as to provide mode matching of the optical signal OPT to an associated optical fiber or waveguide into which the optical signal OPT is launched. In an alternate embodiment, the turning mirror 112 may be configured as a partial reflector or beam splitter to tap a portion of the optical signal OPT.

In the example of FIG. 3, the optical coupler 100 also includes an anti-reflective structure 116 arranged above the boundary between the interposing material 110 and the dielectric material 114, and thus the TIR turning mirror 112. The anti-reflective structure 116 is configured to provide a refractive-index interface for the reflected optical signal OPT between the TIR turning mirror 112 and a medium (e.g., air) over the interposing material 110. As a first example, the anti-reflective structure 116 can be configured as an anti-reflective coating that has been deposited on the interposing material 110, such as including one or more layers of silicon-nitride and silicon-dioxide. As another example, the anti-reflective structure 116 can be configured as an adiabatically tapered material that has been deposited on the interposing material 110. Therefore, the optical signal OPT can exit the interposing material 110 with substantially minimal reflective losses of portions of the optical signal OPT being reflected back into the optical coupler 100. As another example, the interposing material 110, the dielectric material 114, and/or turning mirror 112 can be substantially thicker than and/or recessed below the waveguide 102. In which case, the optical signal OPT is allowed to diverge over a longer distance prior to reflecting off the TIR turning mirror 112.

The optical coupler 100 thus demonstrates an example of an optical coupler 100 that can implement total-internal-reflection, and thus can be fabricated without sputtering layers of reflective material (e.g., metal) onto the angular face of the dielectric material 114. The optical coupler 100 can be fabricated in a variety of different ways. As an example, an SOI structure can be dry-etched with respect to the first semiconductor layer 102 to form a recess that defines the end portion 108 and the space on which the interposing material 110 and the dielectric material 114 are formed. Subsequent to the dry-etch step, a layer of silicon nitride can be deposited onto the SOI structure, and can undergo a lithography step (e.g., gray-scale lithography) and subsequent etching step or laser ablation step to form the dielectric material 114 on a portion of the recess. A poly-silicon material can be deposited on the remaining portion of the recess, and a chemical-mechanical polishing step can be implemented to form the interposing material 110. The anti-reflective structure 116 can thus be deposited above the interposing material 110 to form the optical coupler 100.

Figure 4:
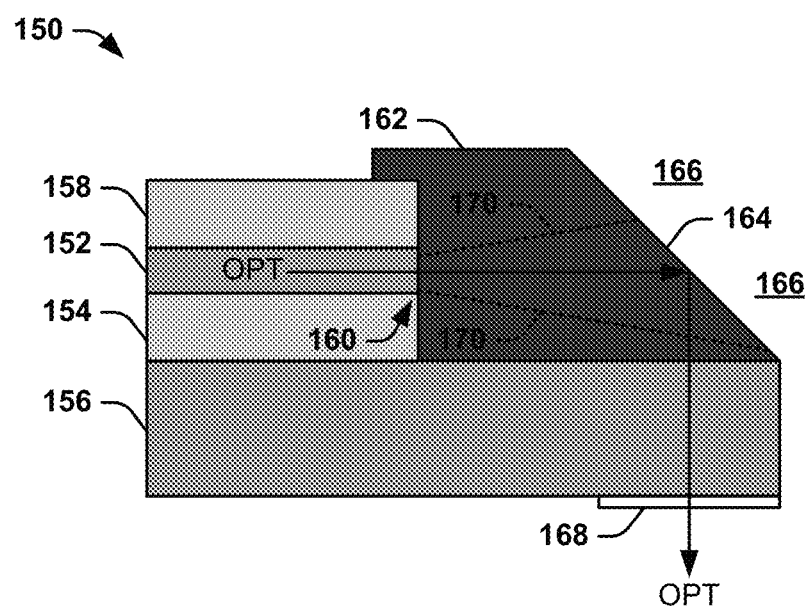
FIG. 4 illustrates yet another example of an optical coupler.

FIG. 4 illustrates another example of an optical coupler 150. The optical coupler 150 can be implemented in any of a variety of optical communications systems to couple an optical signal OPT into a propagation medium, such as an optical fiber or a waveguide. The optical coupler 150 is demonstrated in the example of FIG. 4 as one example of the optical coupler 10 in the example of FIG. 1. The optical coupler 150 is demonstrated in the example of FIG. 4 in a longitudinal cross-sectional view.

The optical coupler 150 comprises a first semiconductor layer 152 that is configured as a waveguide (hereinafter waveguide 152), includes an insulator layer 154 (e.g., a buried-oxide layer), a second semiconductor layer 156 (e.g., substrate), and a second insulator layer 158 disposed on top of the waveguide 152. As an example, the optical coupler 150 can be fabricated from an SOI structure, such that the first semiconductor layer 152 and the second semiconductor layer 156 can be configured as respective silicon layers. The optical signal OPT propagates in the waveguide 152 to an end portion 160, and exits the end portion 160 to propagate in an interposing material 162 before being reflected by a total-internal reflection (TIR) turning mirror 164. In the example of FIG. 4, the TIR turning mirror 164 is demonstrated as a boundary between the interposing material 162 and a medium 166, such as air. The interposing material 162 is demonstrated as having an angular face that is arranged at approximately 45 degrees to reflect the optical signal OPT in an orthogonal direction relative to the propagation of the optical signal OPT in the waveguide 152. However, it is to be understood that the angular face of the TIR turning mirror 164 can have a different angle to control the angle of reflection of the optical signal OPT. In the example of FIG. 4, the angular face of the interposing material 162 is opposite relative to the angular faces associated with the turning mirror 60 and the TIR turning mirror 112 in the respective examples of FIGS. 2 and 3. Therefore, the reflected optical signal OPT is reflected down through the second semiconductor layer 156. As another example, the TIR turning mirror 164 may be coated with a low refractive-index material such as silicon-dioxide to protect it from the environment.

As an example, the interposing material 162 can correspond to a variety of materials, such as a poly-silicon or amorphous silicon, having a refractive index that is approximately equal to the refractive index of the waveguide 152. Therefore, the interposing material 162 can be substantially refractive-index-matched with the waveguide modes in waveguide 152, such that the optical signal OPT can exit the end portion 160 of the waveguide 152 with substantially minimal reflective losses of portions of the optical signal OPT being reflected back into the waveguide 152. However, the medium 166 can have a refractive index that differs from the interposing material 162, such that the boundary of the interposing material 162 and the medium 166 can act as the TIR mirror 164 to reflect the optical signal OPT. Additionally, the second semiconductor layer 156 can be substantially refractive-index-matched with the waveguide modes in waveguide 152 and the interposing material 162, such that the reflected optical signal OPT can likewise exit the interposing material 166 with substantially minimal reflective losses of portions of the optical signal OPT being reflected back into the interposing material 166. In cases where the refractive index of the interposing material 162 cannot be substantially matched, anti-reflective coatings or anti-reflective subwavelength patterns can be formed on the end portion 160 and between second semiconductor layer 156 and interposing material 162, respectively.

In the example of FIG. 4, similar to as described previously in the example of FIG. 2, the interposing material 162 has a height that extends both above the waveguide 152 and below the waveguide 152 to the second semiconductor layer 156. Therefore, the entire angular face of the interposing material 162 can be configured as the TIR turning mirror 164. Therefore, the TIR turning mirror 164 can be configured to allow substantially complete reflection of the optical signal OPT, including diverging optical energy that is demonstrated in the example of FIG. 4 by the dashed lines 170. Therefore, the TIR turning mirror 164 can be spaced apart from the end portion 160 of the waveguide 152 by a sufficient distance, similar to as described previously in the example of FIG. 2. In addition, the surface of the angular face of the dielectric material 164, and thus the TIR turning mirror 164, can be fabricated as non-planar. Therefore, the TIR turning mirror 164 can be further configured to at least one of split, focus and collimate (e.g., symmetrically or asymmetrically) the reflected optical signal OPT, such as to provide power splitting and mode matching of the optical signal OPT to an associated optoelectronic device, optical fiber, or waveguide into which the optical signal OPT is launched.

In the example of FIG. 4, the optical coupler 150 also includes an anti-reflective structure 168 arranged on the second semiconductor layer 156 opposite the interposing material 162 below a boundary between the interposing material 162 and the dielectric material 164, and thus below the TIR turning mirror 164. The anti-reflective structure 168 is configured to provide a refractive-index interface for the reflected optical signal OPT between the TIR turning mirror 164 and the medium 166 (e.g., air) over the interposing material 162. As a first example, the anti-reflective structure 170 can be configured as an anti-reflective coating that has been deposited on the second semiconductor material 156, such as including one or more layers of silicon-nitride and silicon-dioxide. As another example, the anti-reflective structure 168 can be configured as an adiabatically tapered material that has been deposited on the second semiconductor material 156. Therefore, the optical signal OPT can exit the second semiconductor material 156 with substantially minimal reflective losses of portions of the optical signal OPT being reflected back into the optical coupler 150. Alternatively, the anti-reflective structure 168 can be formed as a subwavelength patterned surface of second semiconductor material 156.

The optical coupler 150 thus demonstrates another example of an optical coupler 10 that can implement total-internal-reflection, and thus can be fabricated without sputtering layers of reflective material (e.g., metal) and additional materials (e.g., the dielectric material 114 in the example of FIG. 3). The optical coupler 150 can be fabricated in a variety of different ways. As an example, a silicon dioxide can be deposited on an SOI structure to form the second insulator layer 158, and the resulting structure can be dry-etched with respect to the first semiconductor layer 152 and the first and second insulator layers 154 and 158 to form a recess that defines the end portion 160 and the space on which the interposing material 162 is formed. Subsequent to the dry-etch step, a layer of poly-silicon can be deposited onto the SOI structure, and can undergo a lithography step (e.g., gray-scale lithography) and subsequent etching step or laser ablation step to form the interposing material 162 on the recess. The anti-reflective structure 168 can thus be deposited onto the second semiconductor layer 156 to form the optical coupler 150.

Therefore, as described herein, the optical couplers 10, 50, 100, and 150 are each examples of optical couplers that can be implemented to launch the optical signal OPT into an optoelectronic device, optical fiber or waveguide in an efficient manner with a substantially simplified design. As described herein, the optical couplers 10, 50, 100, and 150 can be configured to reflect the optical signal OPT having any wavelength or polarization or waveguide mode, and are not limited to specific wavelengths and polarizations and single mode waveguides and single mode optoelectronic devices as are typical optical couplers that implement gratings. Additionally, the optical couplers 10, 50, 100, and 150 described herein are likewise not subject to high insertion losses as are typical grating couplers. Furthermore, the optical couplers 10, 50, 100, and 150, as described herein, can be implemented more simplistically than other types of optical couplers, such as edge-coupled tapered waveguides that can require long taper lengths and sharp taper tips that can be difficult to fabricate and position, and which cannot be tested on a wafer level.

It is to be understood that the optical couplers 10, 50, 100, and 150 described herein are not limited to the examples of FIGS. 1-4, and are not limited to the fabrication methodology described herein. For example, the arrangement of the TIR turning mirrors 112 and 164 can be provided as boundaries of a variety of different materials at a variety of angles, and are not limited to the boundaries between the interposing material 110 and the dielectric material 114 in the example of FIG. 3, or the interposing material 162 and the medium 166 in the example of FIG. 4. As another example, the optical couplers 10, 50, 100, and 150 are not required to be fabricated from SOI structures as described herein, but could be fabricated from any of a variety of layered structures via a variety of different fabrication steps. Therefore, the optical couplers 10, 50, 100, and 150 can be configured in a variety of different ways.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An optical coupler comprising:
 a waveguide formed by etching within a first layer of a layered structure that is to propagate an optical signal, the waveguide comprising an end portion; and
 a turning mirror comprising a bulk structure and a reflective material deposited on an angular face of the bulk structure to form a surface of the turning mirror, the bulk structure having a greater cross-sectional size than a cross-sectional size of the waveguide, such that the angular face extends above and below the first layer of the layered structure and extends into a second layer of the layered structure below the first layer, the surface of the turning mirror being arranged to reflect the optical signal that is provided from the end portion of the waveguide wherein the bulk structure is deposited onto and in contact with at least a portion of the second layer.

2. The optical coupler of claim 1, wherein the layered structure is a silicon-on-insulator (SOI) structure, such that the first layer is a first silicon layer of the SOI structure and the second layer is an insulator layer below the first silicon layer.

3. The optical coupler of claim 1, wherein the end portion is fabricated to provide anti-reflection of the optical signal with respect to the waveguide.

4. The optical coupler of claim 3, wherein the end portion comprises one of a sub-wavelength pattern and an adiabatic tapered structure with respect to a cross-section of the waveguide to provide the anti-reflection of the optical signal.

5. The optical coupler of claim 1, wherein the surface of the turning mirror is non-planar to at least one of split, focus, and collimate the reflected optical signal.

6. The optical coupler of claim 1, wherein the bulk structure comprises one or more of poly-silicon, silicon dioxide, silicon nitride, or SU-8.

7. The optical coupler of claim 1, wherein the angular face of the bulk structure is shaped from a process involving one or more of lithography, dry etching, wet etching, or laser-ablation.

8. The optical coupler of claim 1, wherein the reflective material comprises one or more of titanium, platinum, or gold.

9. The optical coupler of claim 5, wherein the surface of turning mirror is further configured to provide mode matching of the optical signal to an optical fiber or waveguide into which the optical signal is launched.

* * * * *